United States Patent [19]

Schorr

[11] 4,132,377
[45] Jan. 2, 1979

[54] STORE EJECTOR RELEASE UNITS

[75] Inventor: Murray A. Schorr, Bow Brickhill, England

[73] Assignee: Westland Aircraft Limited, Yeovil, England

[21] Appl. No.: 789,841

[22] Filed: Apr. 22, 1977

[30] Foreign Application Priority Data

Apr. 30, 1976 [GB] United Kingdom ............... 17844/76

[51] Int. Cl.² ............................................. B64D 1/02
[52] U.S. Cl. ............................... 244/137 R; 89/1.5 B; 89/1.5 G
[58] Field of Search ................... 244/137 R; 89/1.5 R, 89/1.5 B, 1.5 C, 1.5 F, 1.5 G; 294/83 R, 83 AE

[56] References Cited

U.S. PATENT DOCUMENTS

| 3,610,094 | 10/1971 | Craigie | 244/137 R X |
| 3,784,132 | 1/1974 | Newell | 244/137 R |

FOREIGN PATENT DOCUMENTS

2261173  12/1972  Fed. Rep. of Germany ...... 244/137 R

Primary Examiner—Barry L. Kelmachter
Attorney, Agent, or Firm—Larson, Taylor and Hinds

[57] ABSTRACT

An ejector release unit for carrying aircraft stores is provided having single-pronged or double-pronged hooks adapted to be pivotably mounted on the unit. The hooks are utilized with wedges, spigots, and crutch arm adaptors in arrangements that enable interchangeable selective fitment to the unit. This arrangement provides for sway bracing of a store to be carried by the unit by a crutched or crutchless system as is required. Two alternative crutched arrangements are disclosed.

9 Claims, 7 Drawing Figures

STORE EJECTOR RELEASE UNITS

This invention concerns store ejector release units (ERU's) for aircraft, that is to say the units that are used for carrying jettisonable stores such as bombs and weapon carriers on an aircraft.

Conventionally, ERU's comprise a pair of hooks that mate with lugs secured to a store, and a pair of ejector rams that are actuated when the hooks are withdrawn so as to force the released store positively away from the aircraft and thereby ensure its clean and positive separation from the aircraft. The lugs are mounted along the longitudinal centreline of the store and by their spacing provide restraint of relative motion between the store and the aircraft in at least the pitching plane. Depending on their configuration, the lugs may also be adapted to provide restraint of relative motion in the longitudinal (fore and aft) direction and in the yawing plane. However, the lugs are not normally adapted to resist lateral loads that would induce lateral swaying of the store with respect to the aircraft.

ERU's therefore, in general, incorporate sway-bracing means for bracing a suspended store against swaying movement under lateral loads. One such sway-bracing means comprises a crutching system including reaction pads symmetrically disposed two on each side of the longitudinal centreline of the store, and that bear against the surface of the store when the latter is supported by the hooks of the unit engaging the lugs on the store. Another form of sway-bracing means, the so-called crutchless system, involves the use of so-called saddle lugs on the store. These lugs have a substantial lateral width and are adapted to be engaged by complementary hook systems, and by laterally spaced-apart wedges that act between the ERU body and the saddle lugs so as to brace the saddle lugs against the co-operating hooks of the unit in a manner to prevent lateral rocking of the lugs and consequent swaying motion of the store to which they are fitted. Crutchless ERU's of this construction are for instance disclosed in U.K. Patent No. 1,092,828.

Both such sway-bracing arrangements have certain advantages and certain compensating disadvantages. Thus, for instance, sway-bracing by means of a crutching system is bulky and aerodynamically unclean, and because of the need to adjust the reaction pads to engage the suspended store with an appropriate preload, the process of fixing a store to an ERU having a crutching system is tedious and time-consuming. On the other hand the relatively wide separation of the reaction pads of the crutching system engaging the store on opposite sides of its longitudinal centreline enables the lateral sway-inducing loads reacted by the crutching system to be diffused into the store structure with the avoidance of excessive peak stresses. Crutchless ERU's, however, are generally less bulky and aerodynamically cleaner and provide for more rapid fixing of stores thereto but lead to highly concentrated stresses in the store in the region of the saddle lugs when sway-inducing lateral loads are applied to the store. Some types of jettisonable store are incapable of accepting such concentrated stresses and may not, therefore, be carried by crutchless ERU's.

For reasons such as enumerated above, crutchless ERU's are generally preferred to those associated with crutching systems, but multi-role military aircraft need to be able to carry stores selected from a wide variety of types and, as indicated, certain types of store are not suitable for carrying by a crutchless ERU.

Accordingly, in its broadest aspect, the present invention provides an ejector release unit having alternative sway-bracing means arranged for interchangeable selective fitment to said unit, so as to provide for sway-bracing of a store to be carried by said unit by a crutched system or by a crutchless system as required.

It should be understood that an ERU in accordance with the invention may thus be adapted, by selective fitment of the appropriate alternative sway-bracing means, to the carriage of stores fitted with saddle lugs for crutchless sway-bracing or to the carriage of stores requiring to be sway-braced by a crutching system. Furthermore, the selective fitment of the alternative sway-bracing means can be readily accomplished with the ERU installed in an aircraft.

In preferred embodiments, the ejector release unit includes, adjacent each end of the unit, hook means pivotally mounted on a removable sleeve carried by the unit for engagement, during operation, in supporting means attached to the store, and two laterally spaced wedges slidably mounted in inclined slots in the unit and arranged during operation to contact an upwardly facing surface attached to the store thereby to provide for crutchless sway-bracing of the store, and a crutch arm adaptor arranged for selective fitment to the unit and including laterally extending arms, each arm carrying a jacking screw having a pivoted reaction pad for engagement, during operation, with an external surface of the store thereby to provide for crutched sway-bracing of the store.

The hook means may comprise first and second interchangeable hooks, the first hook comprising a double-pronged hook for engagement in supporting slots in a saddle lug comprising the supporting means attached to the store, the upwardly facing surface being conveniently formed on the saddle lug, whereas the said second hook comprises a single-pronged hook for engagement in a bale lug comprising the supporting means attached to the store.

A downwardly protruding spigot may be provided, for use in combination with the double-pronged hook, for engagement during operation with a recess in the saddle lug. Preferably, the spigot is threadably attached to the unit and the crutch arm adaptor is arranged for selective fitment to the unit by a bolt screwed into a threaded hole vacated by the spigot.

In one form of the invention, the crutch arm adaptor is mounted on the unit so as to be capable of limited vertical movement, the movement being taken up during operation, by the wedges contacting an upwardly facing surface formed on the adaptor.

In another form of the invention, two laterally spaced keys are secured to an upper surface of the adaptor for location, when the adaptor is fitted, in the inclined slots in the unit vacated by the wedges. Preferably, the keys have parallel opposed surfaces and are located in slots in the upper surface, the slots having an inclined surface at a similar angle to the inclined slots in the unit and are arranged to be parallel thereto.

The crutch arm adaptor may include an upwardly extended generally tubular portion that, conveniently, is arranged so that an outer diameter thereof engages in a mating recess in the unit and a central aperture provides location for the bale lug when the store is fitted. Preferably, bale lug location faces are provided in the central aperture and arranged during opertion to contact adjacent surfaces of the bale lug so as to restrain relative motion between the store and the unit in both longitudinal and yawing planes.

In another aspect, the invention provides an ejector release unit comprising, in combination, at each end of the unit, first hook means comprising a double-pronged hook arranged during operation to engage in supporting slots in a saddle lug attached to a store; a spigot threadably mounted in the unit so as to protrude downwardly to engage in a recess in the saddle lug; two laterally spaced wedges located in inclined slots in the unit and being operatively associated with said first hook so as to contact, during operation, an upper surface of the saddle lug thereby to provide crutchless sway-bracing of the store; second hook means interchangeable with the first hook means and comprising a single-pronged hook for engagement in a supporting slot in a bale lug attached to the store; a crutch arm adaptor for selective attachment to the unit in place of the spigot by a bolt screwed into a threaded hole vacated by the spigot, the crutch arm adaptor being arranged for limited vertical movement relative the unit and having an upper surface for contact by the wedges, and laterally arranged arms, each arm carrying a jacking screw having a pivoted reaction pad arranged to contact an external surface of the store during operation thereby to provide crutched sway bracing of the store.

In yet another aspect, the invention provides an ejector release unit, comprising in combination, at each end of the unit, first hook means comprising a double-pronged hook arranged during operation to engage in supporting slots in a saddle lug attached to a store; a spigot threadably mounted in said unit so as to protrude downwardly to engage in a recess in the saddle lug; two laterally spaced wedges located in inclined slots in the unit and being operatively associated with the hook so as to contact, during operation, an upper surface of the saddle lug thereby to provide crutchless sway-bracing of the store; second hook means interchangeable with the first hook means and comprising a single-pronged hook for engagement in a supporting slot in a bale lug attached to a store; a crutch arm adaptor for attachment to the unit in place of the spigot by a bolt screwed into a threaded hole vacated by the spigot, the crutch arm adaptor having keys fixedly attached to an upper surface thereof for location in the inclined slots in the unit in place of the wedges, the crutch arm adaptor having laterally extending arms, each arm carrying a jacking screw and having a pivoted reaction pad arranged to contact, during operation, an external surface of the store thereby to provide crutched sway-bracing of the store.

The invention will now be described by way of example only and with reference to the accompanying drawings, in which.

It will be understood that, except where stated in the following description, the other end of the unit is identical to that shown in the drawings.

Figure 1:
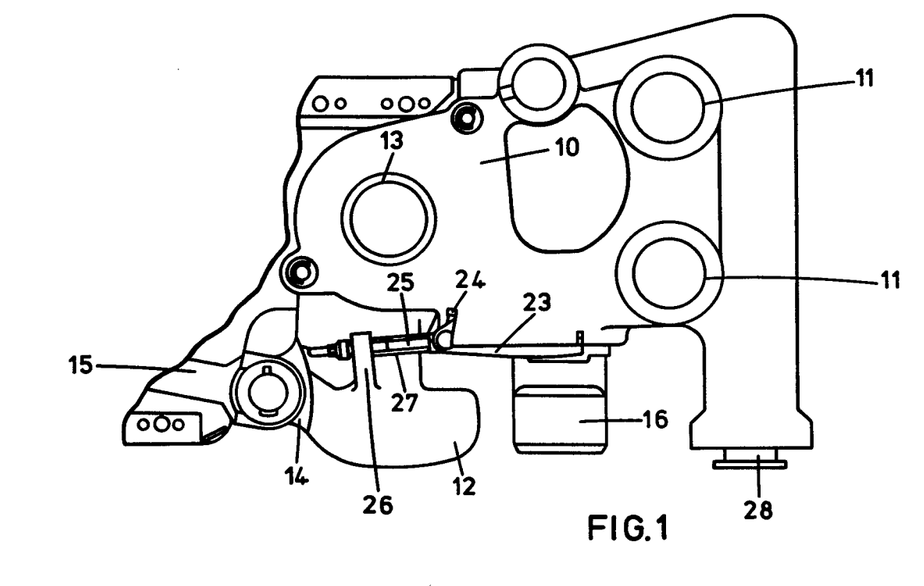
FIG. 1 is a fragmentary side elevation of one end of an ejector release unit according to the invention and shown in its crutchless configuration.
Figure 2:
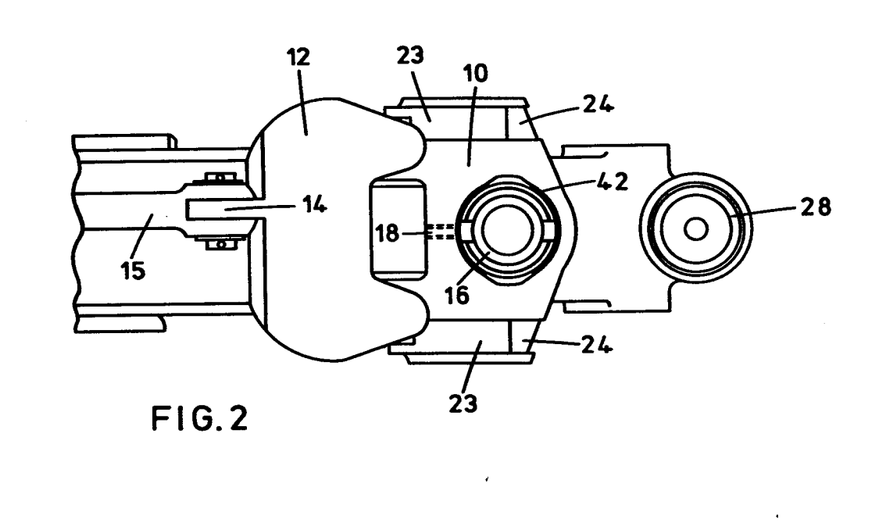
FIG. 2 is an underneath plan view of the end part of the unit shown in FIG. 1.
Figure 3:
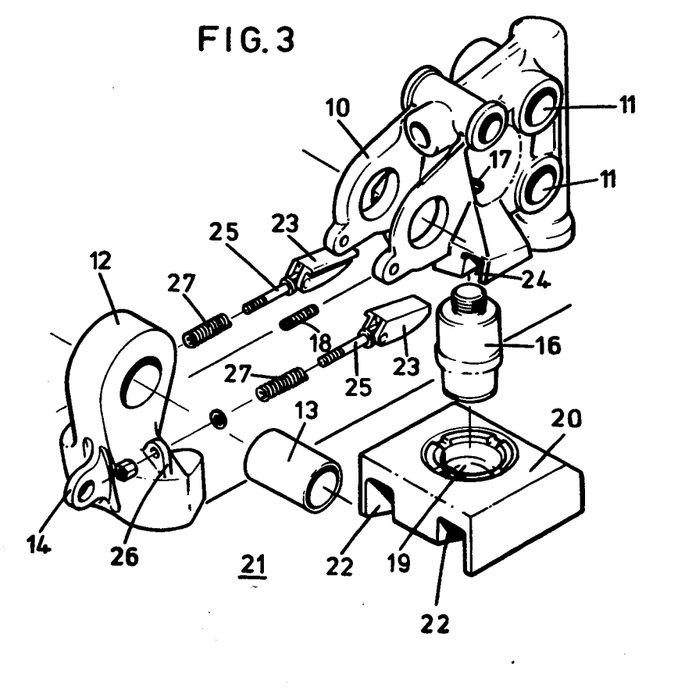
FIG. 3 is a perspective exploded view of the end of the unit shown in FIGS. 1 and 2.

An ejector release unit (ERU) according to the invention is shown in its crutchless configuration in FIGS. 1, 2 and 3, and comprises a body 10 provided with apertures 11 to facilitate attachment of the unit to an aircraft.

An outwardly facing double-pronged hook 12 is pivotally attached to the body 10 by a tubular pivot sleeve 13, the bore of which is also utilised for attachment purposes. A lug 14 formed on the hook 12 is pivotally attached to one end of a connecting lever 15, the other end of which is operatively associated with an actuating mechanism (not shown) arranged to cause pivotal movement of the hook 12 between its engaged position (shown in FIGS. 1 and 2) in which it supports a store, and a disengaged position in which the store is released. The actuating mechanism is operated by gas pressure from an electrically fired cartridge in a manner well known in the art.

A downwardly extending spigot 16 is centrally located in a recess 42 and screwed into a threaded hole 17 in the body 10 and locked by a threaded locking screw 18. In operation, the protruding end of the spigot 16 locates in a mating recess 19 in a saddle lug 20 (FIG. 3) secured to a surface of a store 21 to be carried by the ERU, in order to locate the store and to provide for the transmission of longitudinal (fore and aft) and yaw plane forces between the ERU and the store 21.

The saddle lug 20 is provided with two laterally arranged slots 22 for engagement by the prongs of the hook 12 when in its engaged position thereby providing support for the store 21.

Two laterally spaced wedges 23 are slidably located in inclined slots 24 in the body 10 and are arranged, in operation, to be urged into contact with an upper surface of the saddle lug 20 to provide crutchless sway-bracing of the store 21. Each wedge 23 is connected through a threaded pin 25 to a lug 26 provided on each side of the hook 12 so that movement of the hook 12 to its disengaged position causes automatic withdrawal of the wedges 23 from their operational position. A spring 27 located on each pin 25 serves to urge the wedge 23 into its operational position when the hook 12 is moved to its engaged position.

Spaced outwardly of the spigot 16 and on the longitudinal centreline of the unit is a gas pressure operated piston 28 housed in a cylinder formed in the body 10. A lower end of the piston 28 is arranged, during operation, to contact a surface of the store 21 and so as to be automatically extended on withdrawal of the hook 12 to positively eject the store 21 away from the aircraft.

Figure 4:
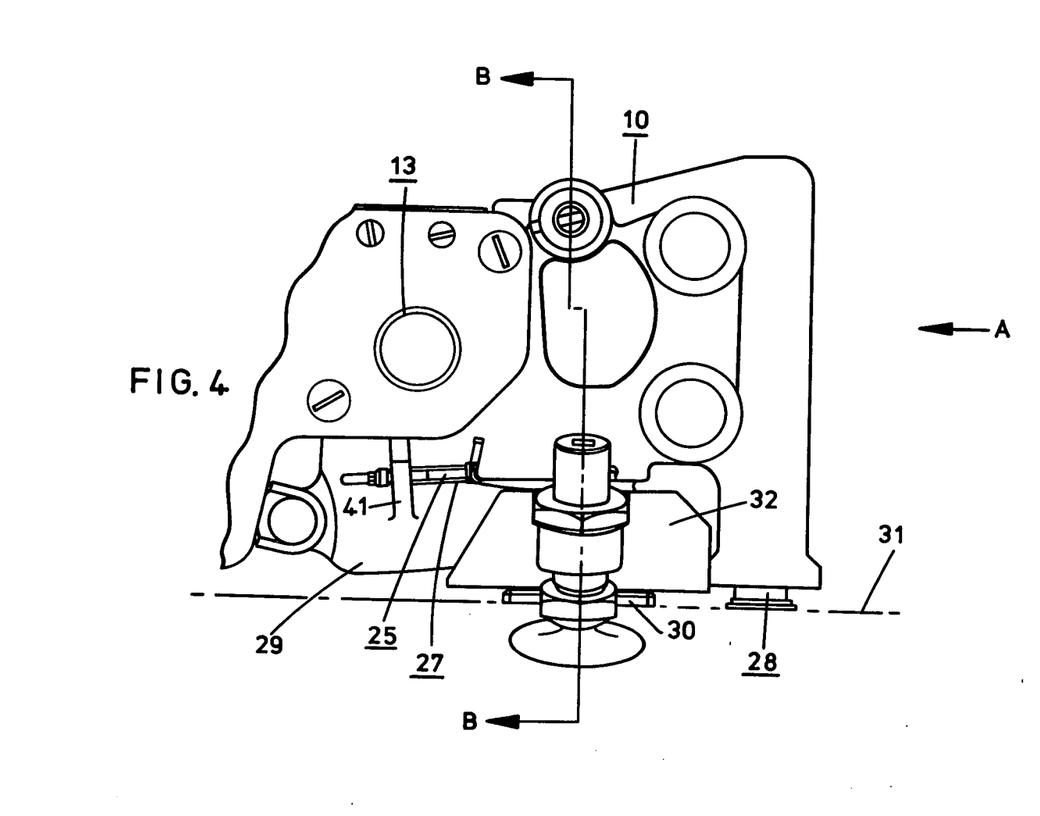
FIG. 4 is a fragmentary side elevation similar to FIG. 1 but showing the unit in its crutched configuration.
Figure 5:
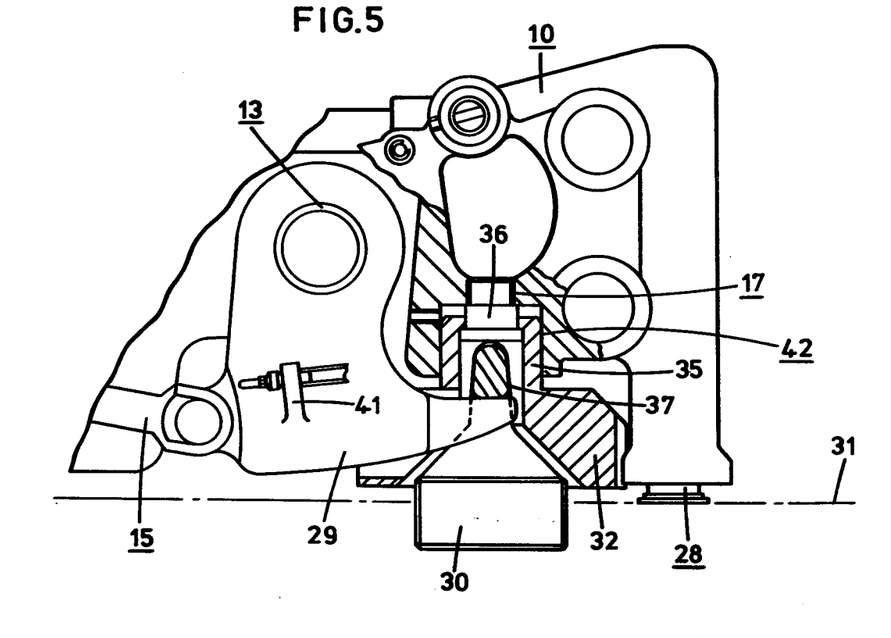
FIG. 5 is a part sectioned view of FIG. 4.
Figure 6:
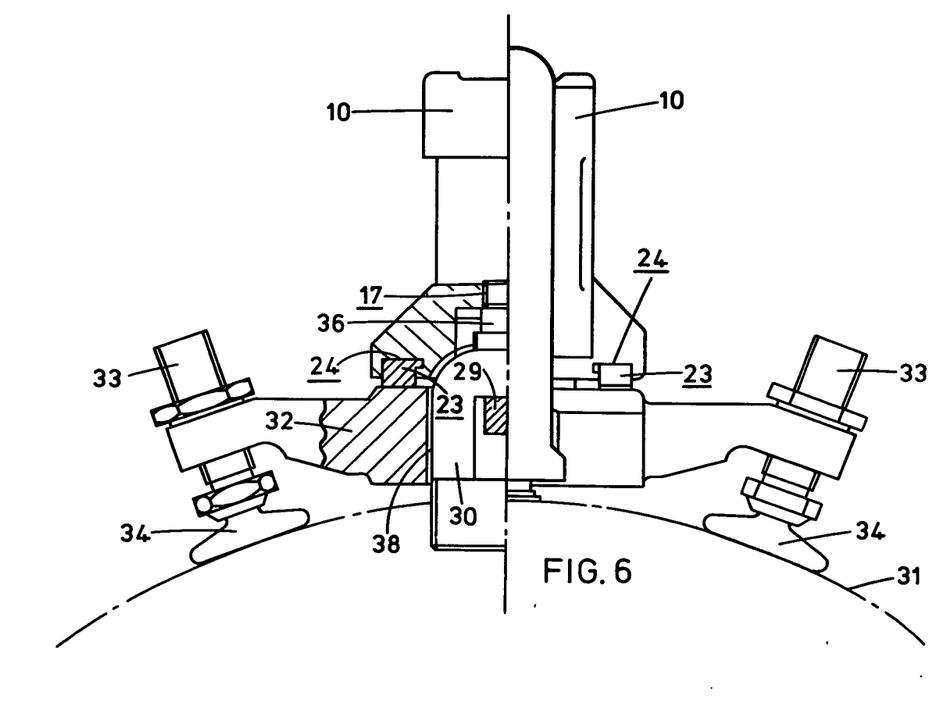
FIG. 6 is a combined end view and sectioned view, the right side of the Figure comprising an end view taken on arrow A of FIG. 4, and the left side of the Figure comprising a part sectioned view taken along lines B-B of FIG. 4, and showing one form of crutching arrangement.
Figure 7:
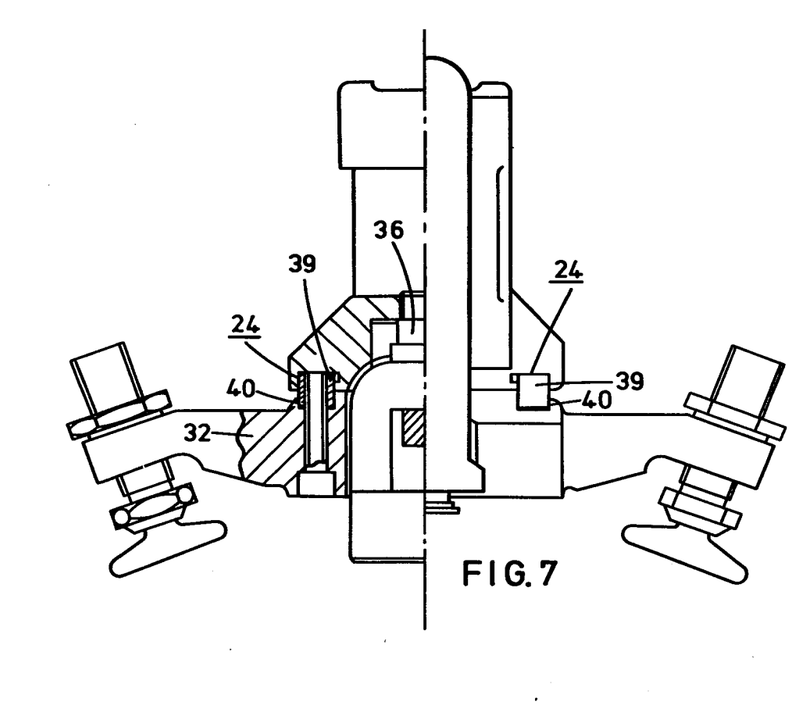
FIG. 7 is a view similar to FIG. 6 and illustrating a further form of crutching arrangement.

FIGS. 4, 5 and 6 illustrate one arrangement of the crutched configuration of the above described ERU, and FIG. 7 illustrates an alternative arrangement. In these Figures and the following description, reference numbers appearing also in FIGS. 1 to 3 have been used to identify parts common to both configurations. Additionally, in FIGS. 4 to 7 the reference numbers of such parts are underlined for further clarification.

Thus in the configuration illustrated in FIGS. 4 to 6, a single-pronged hook 28 is pivotally attached to the body 10 by the pivot sleeve 13, and is connected to the connecting rod 15 and to the wedges 23 through the threaded pins 25 and lugs 41. Hook 29 is arranged to co-operate with a bale lug 30 (of a standard NATO configuration) screwed into a store 31 to be carried and, as before, the piston 28 is arranged to contact a surface of the store 31.

A crutch arm adaptor 32 is secured to the body 10 and includes laterally extending arms as shown in FIG. 6. A jacking screw 33 is threadably mounted at each end of the crutch arm adaptor 32 and carries a pivoted reaction pad 34 adjusted so as to contact an external surface of the store 31 so as to provide crutched sway-bracing of the store 31.

Centrally of the crutch arm adaptor 32, an upwardly extending tubular spigot portion 35 (FIG. 5) locates in the recess 42 in the body 10 and is secured by a shouldered bolt 36 screwed into the threaded hole 17, the shoulder portion of the bolt 36 being arranged so as to provide for limited vertical movement of the crutch arm adaptor 32 relative the body 10.

In this embodiment, the wedges 23 co-operate, in a manner similar to that previously described, with an upper surface of the crutch arm adaptor 32 so that the vertical movement of the adaptor 32 is taken up on positioning of the store 31, which means that it should only be necessary to adjust the jacking screws to accommodate stores 31 of different diameters, and not at every occasion that a new store is fitted.

Location faces 37 (FIG. 5) and 38 (FIG. 6) are provided internally of the spigot portion 35, and are arranged to cooperate with external surfaces of the bale lug 30 to transmit longitudinal and yaw plane forces (through faces 37 and 38 respectively) between the ERU and the store 31. It should be noted that location faces 37 are required at one end only of the unit.

In the alternative arrangement shown in FIG. 7, two laterally arranged keys 39 are fixedly attached in grooves 40 provided in an upper surface of the crutch arm adaptor 32 for location in the inclined slots 24 in the body 10. The keys 39 have parallel opposed surfaces and the grooves 40 are inclined at the same angle and parallel to the inclined surfaces of the slots 24 so that the crutch arm adaptor 32 is fixedly attached to the body 10, by the bolt 36, and all adjustment for sway-bracing of the store 31 is accomplished by adjustment of the jacking screws 33.

The sequence of operation in converting the ERU according to the invention from its crutchless configurtion (FIGS. 1 to 3) to its crutched configuration (FIGS. 4 to 6) will now be described, and for the purpose of this description the unit is assumed to be installed on an aircraft. It should be understood that the described procedure is required to be carried out at each end of the unit.

(1) Unscrew the mounting bolt (not shown) from the hook pivot sleeve 13, and withdraw the sleeve 13 from the body 10.
(2) Remove the nuts securing the threaded pins 25 to the lugs 26 on the hook 12 and withdraw the wedges 23 from the slots 24.
(3) Lower the hook 12 and remove the connecting rod 15 from the lug 14.
(4) Remove the locking screw 18, and unscrew the spigot 16 from the threaded hole 17.
(5) Attach the single-pronged hook 29 to the connecting rod 15, then offer up the hook 29 and insert the hook pivot sleeve 13.
(6) Refit the mounting bolt through the sleeve 13, and screw and tighten into the aircraft mounting.
(7) Insert the edges 23 into their respective slots 24, and connect the threaded pins 25 to the lugs 41 on the hook 29.
(8) Locate the tubular spigot portion 35 of the crutch arm adaptor 32 into the recess 42 in the body 10, and secure the adaptor 32 with the shouldered bolt 36 screwed into the threaded hole 17. In order to ensure that the bolt 36 is correctly tightened, the hook 29 should be moved manually to its disengaged position so as to withdraw the wedges 23 out of contact with the upper surface of the adaptor 32.

The ERU is now ready for use in its crutched configuration.

As previously stated in the description relating to FIG. 6, when the hook 29 is in its disengaged position and the wedges 23 are withdrawn, the crutch arm adaptor 32 is capable of limited vertical movement (3 mm. in one particular unit), so that when a store 31 is lifted into position the adaptor 32 is raised to allow for overtravel. When the hook 29 is thereafter moved to its engaged position in engagement with the bale lug 30, the wedges 23 are automatically driven along the inclined slots 24 between the upper surface of the adaptor 32 and the body 10 of the unit. Accordingly, once the jacking screws 33 have been adjusted to suit a store of a particular nominal diameter, it should not be necessary to adjust the jacking screws 33 to cater for small deviations from that nominal diameter since such deviations will be taken up by automatic re-positioning of the wedges 23 on fitment of the store.

In the alternative crutched arrangement shown in FIG. 7, the wedges 23 are not used and the keys 39 locate in the wedge slots 24 in the body 10 so that the crutch arm adaptor 32 is fixedly attached to the body 10 with no freedom for limited vertical movement. In this case, all the sway-brace crutching adjustments are accomplished by adjustment of the jacking screws 33 so that small deviations of a particular store from the nominal diameter thereof may require individual re-adjustment of the jacking screws 33 to accommodate such deviations.

It should be understood that the ERU of the present invention is equally easily converted from its crutched configuration to its crutchless configuration by reversing the sequence of operations hereinbefore described.

Thus, the present invention provides an ERU that is quickly and easily convertible between crutched and crutchless sway-bracing configurations to enable various types of stores to be carried by the same basic unit. Whereas a particular arrangement of the invention has been described and illustrated, it should be noted that many modifications may be made without departing from the scope of the appended claims.

A store capable of being carried in the crutchless configuration requires to be fitted with the saddle lug for co-operation with the wedges of such a sway-bracing system, whereas stores adapted to be carried in the crutched configuratiion are usually fitted with so-called bale lugs of a standard (NATO) configuration requiring a different type of hook from that needed for co-operation with the saddle lug. Conversion of an ERU in accordance with the invention as hereinbefore described from the crutchless configuration to the crutched configuration thus involves substitution of the appropriate interchangeable hooks and the fitment and removal of the crutch arm adaptors.

However, it should be understood that stores fitted with saddle lugs may also be carried by the ERU of the invention when in its crutched sway-bracing configuration. In such a case there will be no requirement to change the hooks as hereinbefore described from those appropriate for crutchless sway-bracing, although it is necessary for the unit to provide spigots for co-operation with the recesses provided in the saddle lugs. For such purposes, the crutch arm adaptors may either be arranged to be retained by or without removal of the spigots necessary in the crutchless configuration, or the crutch arm adaptors may themselves incorporate appropriately located spigots.

Alternatively, in an ERU according to the invention for carrying saddle lug-supported stores in either its crutched or crutchless configuration, the locating spigot may be arranged concentric with the ejector piston as opposed to the spaced relationship hereinbefore described. In such an arrangement, alternative means of attaching the crutch arm adaptor may be utilized, for example, the adaptor may be provided with a generally central aperture for location on the spigot, and bolt holes corresponding with threaded holes in a lower surface of the body of the unit for fixedly attaching the adaptor.

I claim as my invention:

1. An ejector release unit comprising a basic assembly for attachment to an aircraft and a kit of parts for selective use with the basic assembly to enable the unit to be converted between crutched and crutchless configurations for the carriage of bale lug and saddle lug supported stores respectively, said kit of parts comprising,
   removable pivot sleeves adjacent each end of the unit,
   first and second pairs of interchangeable hooks adapted for selective pivotal mounting on said removable pivot sleeves,
   said first pair of hooks comprising double pronged hooks for selective engagement in supporting slots in saddle lugs attached to a store to be carried,
   two pairs of wedges adapted to be slidably mounted in inclined slots spaced laterally of said hooks in said unit so as to contact an upwardly facing surface of said saddle lugs thereby providing crutchless sway bracing of said store,
   said second pair of hooks comprising single pronged hooks for selective engagement in a supporting slot in bale lugs attached to a store to be carried,
   two crutch arm adaptors arranged for selective fitment one at each end of the unit, each adaptor including laterally extending arms,
   a jacking screw on each of said laterally extending arms, each jacking screw having a pivoted reaction pad for operative engagement with an external surface of said bale lug supported store, thereby providing for crutched sway bracing of said bale lug supported store,
   two spigots adapted for selective fitment to the unit so as to protrude downwardly therefrom for engagement in recesses provided in the saddle lugs, said spigots and said crutch arm adaptors being arranged for selective fitment, to the unit at common threaded holes provided in the unit, said spigots having a threaded portion for engagement in the threaded holes and,
   bolts to be screwed into said threaded holes for screwing on said crutch arm adaptors.

2. An ejector release unit as claimed in claim 1, wherein said bolts are arranged so that, when fitted, said crutch arm adaptors are capable of limited vertical movement relative the unit, said crutch arm adaptors being provided with an upwardly facing surface for contact by said wedges.

3. An ejector release unit as claimed in claim 1, wherein two laterally spaced keys are attached to an upper surface of said crutch arm adaptors such that the keys locate in the inclined slots in the unit when the crutch arm adaptors are fitted.

4. An ejector release unit as claimed in claim 3 wherein said keys have parallel opposed surfaces and are located in slots in said crutch arm adaptors when the crutch arm adaptors are fitted, said slots having an inclined surface parallel with and at a similar angle to said inclined slots in said unit.

5. An ejector release unit as claimed in claim 1 wherein each of said crutch arm adaptors includes an upwardly extending generally tubular portion, an outer diameter of said portion engaging a mating recess in said unit when the crutch arm adaptors are fitted, said generally tubular portion having a central aperture in which said bale lug is located during operation.

6. An ejector release unit as claimed in claim 5 wherein said central aperture includes bale lug location faces adapted to contact adjacent surfaces of the bale lug, when fitted, so as to restrain relative motion between the store and the unit in both longitudinal and yawing planes.

7. An ejector release unit comprising a basic assembly for attachment to an aircraft and a kit of parts for selective use with the basic assembly to enable the unit to be converted between crutched and crutchless configurations for the carriage of bale lug and saddle lug supported stores respectively, said kit of parts comprising,
   removable pivot sleeves adjacent each end of the unit,
   first and second pairs of interchangeable hooks adapted for selective pivotal mounting on said removable pivot sleeves,
   said first pair of hooks comprising double pronged hooks for selective engagement in supporting slots in saddle lugs attached to a store to be carried,
   threaded spigots for mounting in said unit to protrude downwardly to engage recesses in said saddle lugs,
   two pairs of wedges adapted to be slidably mounted in inclined slots in said unit and being operatively associated with said first pair of hooks so as to contact, during operation, upper surfaces of said saddle lugs thereby to provide crutchless sway-bracing of said store,
   said second pair of hooks comprising single pronged hooks for selective engagement in a supporting slot in bale lugs attached to a store to be carried,
   two crutch arm adaptors arranged for selective fitment one at each end of the unit, bolts for attachment of said crutch arm adaptors to said unit by screwing the bolts into threaded holes in the unit provided for said spigots,
   said crutch arm adaptors being arranged for limited vertical movement relative to the unit and having upper surfaces for contact by said wedges and laterally extending arms, each said arm carrying a jacking screw having a pivoted reaction pad arranged to contact an external surface of said bale lug supported store during operation thereby to provide crutched sway-bracing of said bale lug supported store.

8. An ejector release unit as claimed in claim 7 wherein each of said crutch arm adaptors includes an upwardly extending generally tubular portion, an outer diameter of said portion engaging a mating recess in said unit when the crutch arm adaptors are fitted, said generally tubular portion having a central aperture in which said bale lug is located during operation.

9. An ejector release unit as claimed in claim 8 wherein said central aperture includes bale lug location faces adapted to contact adjacent surfaces of the bale lug, when fitted, so as to restrain relative motion between the bale lug supported store and the unit in both longitudinal and yawing planes.

* * * * *